United States Patent
Liu et al.

(10) Patent No.: US 9,150,301 B2
(45) Date of Patent: Oct. 6, 2015

(54) COLLAPSIBLE WING ASSEMBLY

(71) Applicant: SINGAPORE TECHNOLOGIES AEROSPACE LTD, Paya Lebar (SG)

(72) Inventors: Yong Wee Liu, Paya Lebar (SG); Hian Beng Kek, Paya Lebar (SG)

(73) Assignee: Singapore Technologies Aerospace Ltd, Paya Lebar (SG)

(\*) Notice: Subject to any disclaimer, the term of this patent is extended or adjusted under 35 U.S.C. 154(b) by 368 days.

(21) Appl. No.: 13/710,323

(22) Filed: Dec. 10, 2012

(65) Prior Publication Data

US 2014/0008487 A1 Jan. 9, 2014

(30) Foreign Application Priority Data

Dec. 12, 2011 (SG) .............................. 201109176-6

(51) Int. Cl.
*B64C 3/56* (2006.01)
*B64C 39/02* (2006.01)

(52) U.S. Cl.
CPC ................ *B64C 3/56* (2013.01); *B64C 39/024* (2013.01); *B64C 2201/102* (2013.01)

(58) Field of Classification Search
CPC ....................................................... B64C 3/56
USPC .............................. 244/49, 45 R, 131, 199.4
See application file for complete search history.

(56) References Cited

U.S. PATENT DOCUMENTS

| | | | | |
|---|---|---|---|---|
| 3,935,664 A | * | 2/1976 | Neuhierl | .......................... 446/34 |
| 5,035,382 A | * | 7/1991 | Lissaman et al. | ............. 244/190 |
| 5,762,294 A | * | 6/1998 | Jimmerson | ..................... 244/49 |
| 5,941,478 A | * | 8/1999 | Schmittle | ........................ 244/48 |
| 6,032,418 A | | 3/2000 | Larson | |
| 6,086,014 A | * | 7/2000 | Bragg, Jr. | .......................... 244/2 |
| 6,786,450 B1 | * | 9/2004 | Einstein | ............................. 244/2 |
| 7,182,666 B2 | * | 2/2007 | Frontera Castaner | .......... 446/36 |
| 7,789,339 B2 | * | 9/2010 | Sommer | ........................... 244/3 |
| 2006/0091258 A1 | * | 5/2006 | Chiu et al. | .................... 244/119 |
| 2009/0127376 A1 | | 5/2009 | Gomez et al. | |

\* cited by examiner

*Primary Examiner* — Brian M O'Hara
*Assistant Examiner* — Keith L Dixon
(74) *Attorney, Agent, or Firm* — Bret E. Field; Bozicevic, Field & Francis LLP

(57) ABSTRACT

Disclosed herein is a collapsible wing assembly of an unmanned aerial vehicle (UAV) and a method of locking and unlocking the collapsible wing assembly of an unmanned aerial vehicle (UAV). The collapsible wing assembly comprising a center wing adapted to be attached to the fuselage; and a pair of outboard wings, wherein each of the outboard edges of the center wing comprises a first attachment structure, and each of the inboard edges of the outboard wings comprises a second attachment structure, wherein the first attachment structure is operable to engage with the second attachment structure and displace the second attachment structure to a captive position towards the trailing edge of the center wing.

17 Claims, 9 Drawing Sheets

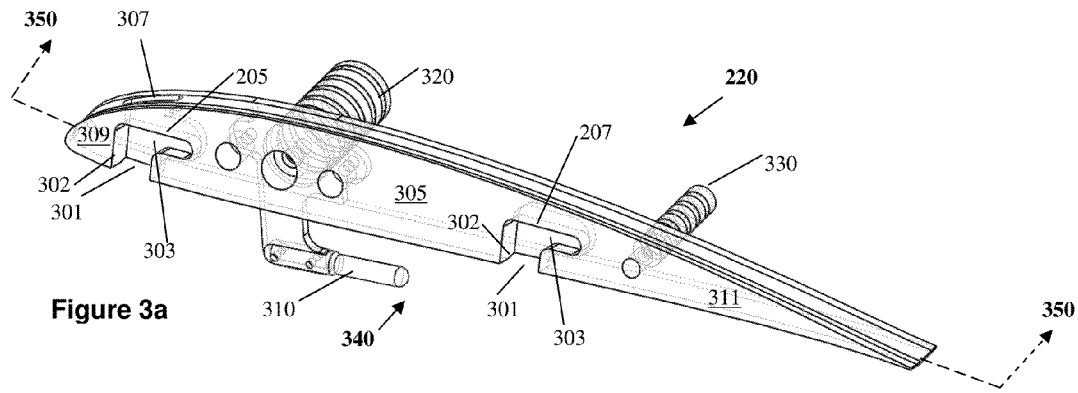
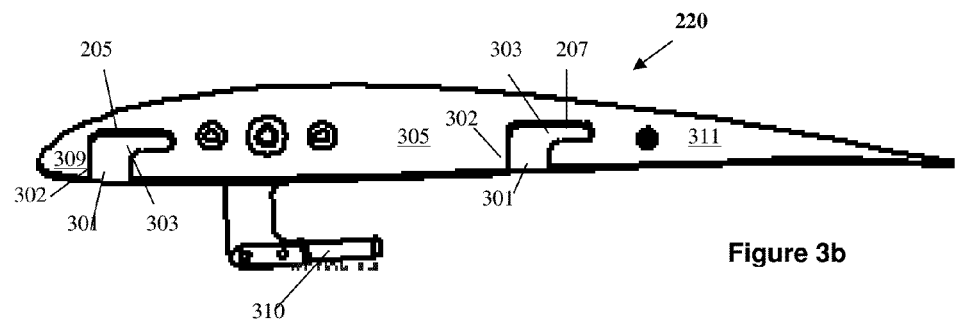
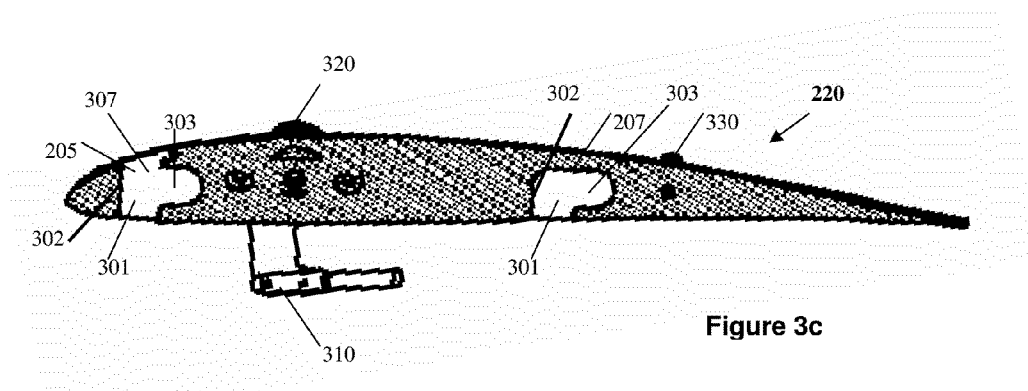

COLLAPSIBLE WING ASSEMBLY

FIELD OF INVENTION

Embodiments of the present invention relate to a collapsible wing assembly of an unmanned aerial vehicle (UAV)

BACKGROUND

A main wing of an UAV may comprise a plurality of segments that can be assembled. As shown in FIGS. 1a to 1c, currently, the main wing of an UAV comprises a centre wing 101 attached to the fuselage of the aircraft, and a pair of outboard wings 103 that can be attached to the outboard edges 102 of the centre wing 101.

Each outboard edge 102 of the centre wing 101 has a square shaped slot 105 and a circular slot 107 that are made of metal. An inboard edge 104 of each outboard wing 103 has a square shaped insert 109 and a circular guide 111 that are made of metal. In use, the slot 105 receives the insert 109 and the slot 107 receives the guide 111. A spring lock 110 is provided on one face of the insert 109 to lock the insert 109 to a hole 113 provided on an underside of the of the centre wing 101.

In order to assemble the main wing, the insert 109 and the guide 111 located on the inboard edge 104 of each outboard wing 103 are inserted into the respective slots 105, 107 located on the outboard edge 102 of the centre wing 101. Once positive connection has been established, the spring lock 110 engages and locks onto the hole 113 found on the underside of the centre wing 101.

In order to detach the outboard wings 103 on site, a special tool e.g. a pin is required so as to pierce through the hole 113 on the centre wing 101 and unlock the spring lock 110.

Due to stringent tolerances between the insert 109 and the slot 105, it is difficult to execute a smooth connecting action.

Furthermore, since a portion of the insert 109 is exposed, it is prone to damages which may further deteriorate the engaging or disengaging action of the wings 101, 103.

Since the insert 109 and the slot 105 are the only point of engagement between the centre wing 101 and the outboard wing 101, when the wings 101, 103 are subjected to high launching load, the trailing edge of joint between the centre wing 101 and the outboard wing 103 tends to twist outward in a span wise direction of the wings 101, 103.

Furthermore, the dihedral angle of the outboard wing 103 depends on the molded dihedral angle of both the centre wing 101 and the outboard wing 103. i.e. the angles at which the outboard edges 102 of the centre wing 101 and the inboard edges 104 of the outboard wing 103 are molded, determine the dihedral angle. Therefore, the centre wing 101 and outboard wing 103 are custom built for a particular dihedral angle.

There is thus a need to provide a collapsible wing that seeks to address one or more of the above disadvantages.

SUMMARY

According to a first aspect of the present invention, there is provided a collapsible wing assembly of an unmanned aerial vehicle (UAV) having a fuselage, the assembly comprising: a centre wing adapted to be attached to the fuselage; and a pair of outboard wings, wherein each of the outboard edges of the centre wing comprises a first attachment structure, and each of the inboard edges of the outboard wings comprises a second attachment structure, wherein the first attachment structure is operable to engage with the second attachment structure and displace the second attachment structure to a captive position towards the trailing edge of the centre wing.

The first attachment structure may comprise at least a pair of L-shaped profile locks, and the second attachment structure comprises at least a pair of locking pins, wherein each of the L-shaped profile lock is operable to engage with a respective locking pin and displace the locking pin to a captive position towards the trailing edge of the centre wing.

The centre wing may comprise a body and a centre wing adaptor mounted to an outboard edge of the body, and wherein the outboard wing comprises a body and an outboard wing adaptor mounted to an inboard edge of the body of the outboard wing, wherein the first attachment structure is provided on an end face of the centre wing adaptor, and the second attachment structure is provided on an end face of the outboard wing adaptor.

The airfoils of the centre wing adaptor and outboard wing adaptor matches respectively to the body of the centre wing and the outboard wing.

The centre wing adaptor and the outboard wing adaptor may be removably mounted respectively to the centre wing and the outboard wing.

One of the L-shaped profile lock maybe located proximate to the leading edge of the centre wing adaptor and the other may be located proximate to the trailing edge of the centre wing adaptor, wherein one of the locking pin may be located proximate to the leading edge of the outboard wing adaptor and the other may be located proximate to the trailing edge of the outboard wing adaptor, wherein each of the L-shaped profile lock may be operable to engage with a respective locking pin and displace the locking pin to a captive position towards the trailing edge of the centre wing.

Each of the L-shaped profile lock may comprises a hollow channel formed on an end face of the centre wing adaptor, wherein the hollow channel comprises a first arm pointing towards the bottom surface of the centre wing adaptor, and a second arm, inclined to the first arm, pointing towards the trailing edge of the centre wing. The first arm may be substantially perpendicular to the second arm.

The bottom surface of the centre wing adaptor may have a pair of openings corresponding to the respective openings of the first arm.

The top surface of the centre wing adapter may have a slot, positioned above the first arm of the L-shaped profile lock, for receiving a locking key to lock any relative movement of the centre wing and outboard wing in the captive position.

The dimension of a head of the locking pin matches with that of the opening of the first arm of the L-shaped profile lock, and the dimension of a stem of the locking pin matches with that of the hollow channel of the second arm of the L-shaped profile lock.

An opposing face of the centre wing adaptor and outboard wing adaptor may comprise one or more anchors for mounting the centre wing adaptor and outboard wing adaptor respectively to an outboard edge of the centre wing and an inboard edge of the outboard wing.

The locking key may comprise a head and a base, wherein the top surface of the head has an inclination to match the top surface of the centre wing adaptor, wherein the base has a slit and a resilient arm, the resilient arm comprises a stepped portion comprising a plurality of inclined steps terminating at the head.

In a locked position, the stepped portion may be operable to grip the stem of the an adjacent locking pin in order to lock any relative movement of the centre wing and the outer wing, and the base of the locking key locks with the opening found on the bottom surface of the centre wing adaptor.

The body of the locking key may comprise a slot for inserting a securing pin in order to secure the locking pin to the centre wing adaptor.

According to a second aspect of the present invention, there is provided a method of locking a collapsible wing assembly of an unmanned aerial vehicle (UAV) having a fuselage, the method comprising the steps of: providing a centre wing adapted to be attached to the fuselage; providing a pair of outboard wings; providing a first attachment structure to each outboard edges of the centre wing; providing a second attachment structure to each inboard edges of the outboard wings; engaging the first attachment structure with the second attachment structure; and displacing the second attachment structure to a captive position towards the trailing edge of the centre wing.

In the above method, the first attachment structure may comprise at least a pair of L-shaped profile locks, and the second attachment structure comprises at least a pair of locking pins, wherein each of the L-shaped profile lock is operable to engage with a respective locking pin and displace the locking pin to a captive position towards the trailing edge of the centre wing.

In the above method, the centre wing may comprise a body and a centre wing adaptor mounted to an outboard edge of the body, and wherein the outboard wing comprises a body and an outboard wing adaptor mounted to an inboard edge of the body of the outboard wing, wherein the first attachment structure is provided on an end face of the centre wing adaptor, and the second attachment structure is provided on an end face of the outboard wing adaptor.

The method may further comprise a step of inserting a locking key into a slot provided on the centre wing adaptor to lock the relative movement of the centre wing and the outboard wing.

According to a third aspect, there is provided a method of unlocking the above collapsible wing assembly locked by the above method, the method comprising the steps of: releasing the locking key; holding the centre wing and moving the outboard wing towards the leading edge of the centre wing; and moving the outboard wing downward to release the outboard wing.

BRIEF DESCRIPTION OF THE DRAWINGS

The invention will now be described with reference to the enclosed drawings, in which:

FIG. 2b is a partial perspective view of a centre wing and outboard wing (in a locked position) of FIG. 2a;

FIG. 3a is a perspective view of a centre wing adaptor in accordance with an embodiment of the present invention;

FIG. 3b is an end view of the centre wing adaptor of FIG. 3a;

FIG. 3c is a sectional view of the centre wing adaptor of FIG. 3a;

FIG. 3d is a bottom view of the centre wing adaptor of FIG. 3a;

FIG. 4b is an end view of the outboard wing adaptor of FIG. 4a;

FIG. 4c is a top view of outboard wing adaptor FIG. 4a;

FIG. 4d is a side view of the outboard wing adaptor of FIG. 4a;

FIG. 6b is a bottom view of the locking key of FIG. 6a;

FIG. 6c is a front view of the locking key FIG. 6a; and

DETAILED DESCRIPTION

Embodiments of the present invention eliminate the need for any special tool for detaching outboard wings and centre wing of an UAV, which is advantageous for operational deployment.

Embodiments of the present invention provide a smooth and positive engagement of the outboard wings and centre wing of an UAV by employing a "profile lock" concept.

Embodiments of the present invention provide centre wing and outboard wings that are operable to be attached and locked with each other.

By employing a dual locking system, embodiments of the present invention provide a seamless joint between the outboard wings and centre wing of an UAV even when the wings are subjected to a high launching load.

In embodiments of the invention, substantial portion of the profile lock are embedded inside the outboard wings and centre wing. The embedded feature of the profile lock increases the lifespan of the UAV.

Embodiments of the present invention provide flexibility to alter the wing dihedral angle of an UAV by swapping an adaptor attached to the centre wing and/or outboard wings.

Figure 1A:
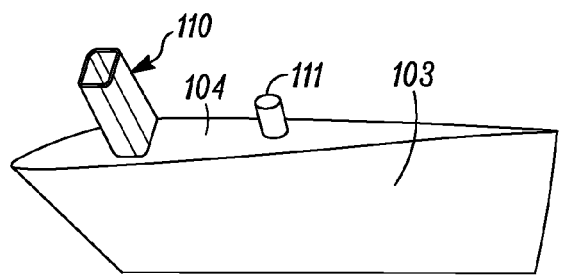
FIGS. 1a to 1c are partial perspective views of a centre wing and outboard wing of a conventional UAV.
Figure 1B:
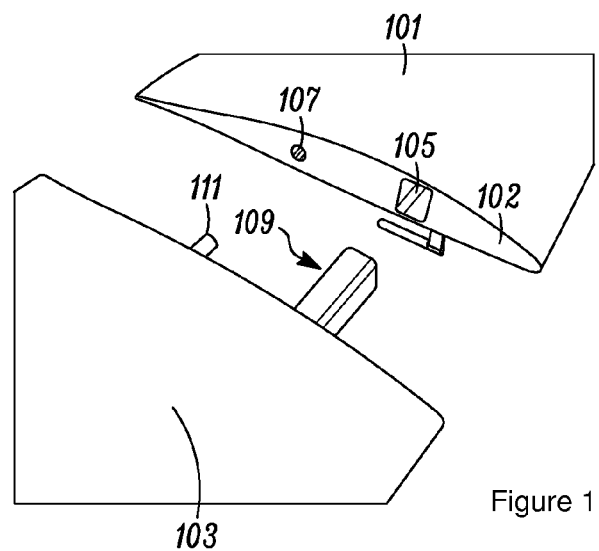
Figure 1C:
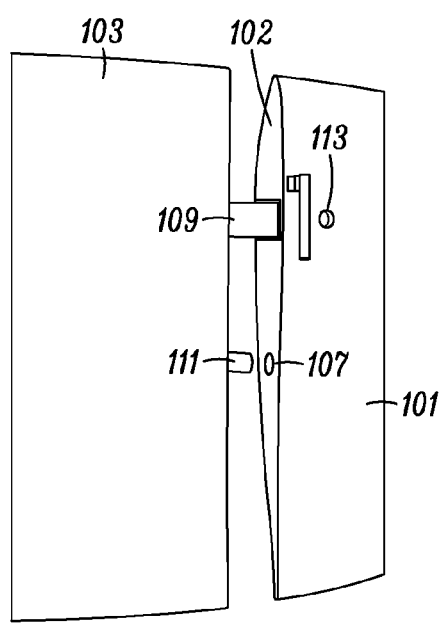
Figure 2A:
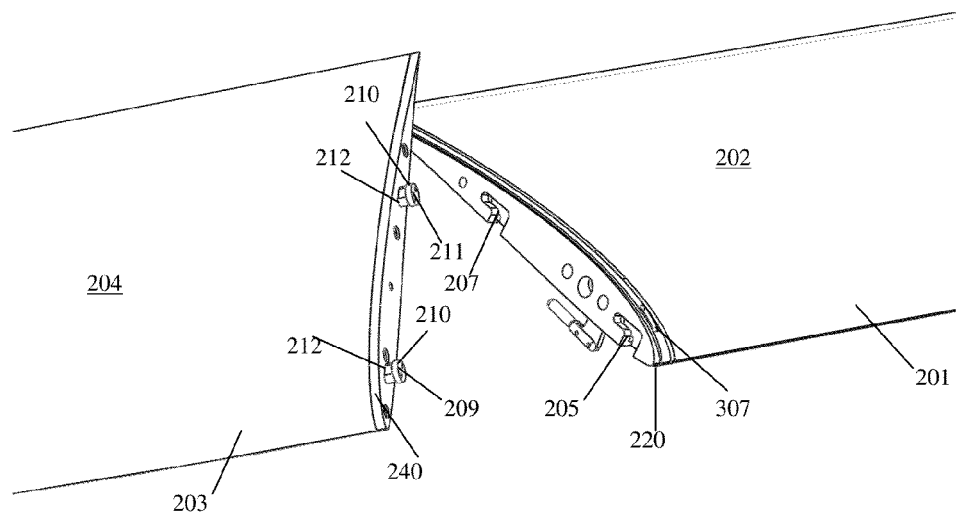
FIG. 2a is a partial perspective view of a centre wing and outboard wing (in an open position) of an UAV in accordance with an embodiment of the present invention.

FIG. 2a is a partial perspective view of a centre wing 201 and outboard wing 203 (in an open position) of an UAV in accordance with an embodiment of the present invention.

Each of the outboard edge of the centre wing 201 and the inboard edge of the outboard wing 203 has an attachment structure for attaching the outboard wing 203 to the centre wing 201.

The centre wing 201 has a body 202 and a centre wing adaptor 220 attached to an outboard edge of the body 202. The centre wing adaptor 220 forms the outboard edge of the centre wing 201. The airfoil of the centre wing adaptor 220 matches with that of the body 202 of the centre wing 201.

The attachment structure of the centre wing 201 consists of two L-shaped profile locks 205, 207. The first L-shaped profile lock 205 is located on the centre wing adaptor 220, proximate to the leading edge of the centre wing adaptor 220. The second L-shaped profile lock 207, substantially identical to the profile lock 205, is located proximate to a trailing edge of the centre wing adaptor 220.

The outboard wing 203 has a body 204 and an outboard wing adaptor 240 attached to an inboard edge of the body 204. The outboard wing adaptor 240 form the inboard edge of the outboard wing 203. The airfoil of the outboard wing adaptor 240 matches with that of the body 204 of the outboard wing 203.

The attachment structure of the outboard wing 203 consists of two locking pins 209, 211. The first locking pin 209 is located proximate to the leading edge of the outboard wing adaptor 240. The second locking pin 211, substantially identical to the locking pin 209, is located proximate to the trailing edge of the outboard wing adaptor 240. The locking pins 209, 211 comprise a circular head 210 and a stem 212. The dimensions of the head 210 and stem 212 are designed to match the openings of the L-shaped profile locks 205, 207 in order to engage and lock a locking pin 209, 211 with a respective L-shaped profile lock 205, 207.

The adaptors 220, 240 can be fabricated for example with a tough and scratch-resistant material such as ABS plastic, delrin, aluminium or steel by e.g. an injection moulding or diecast process.

Figure 5A:
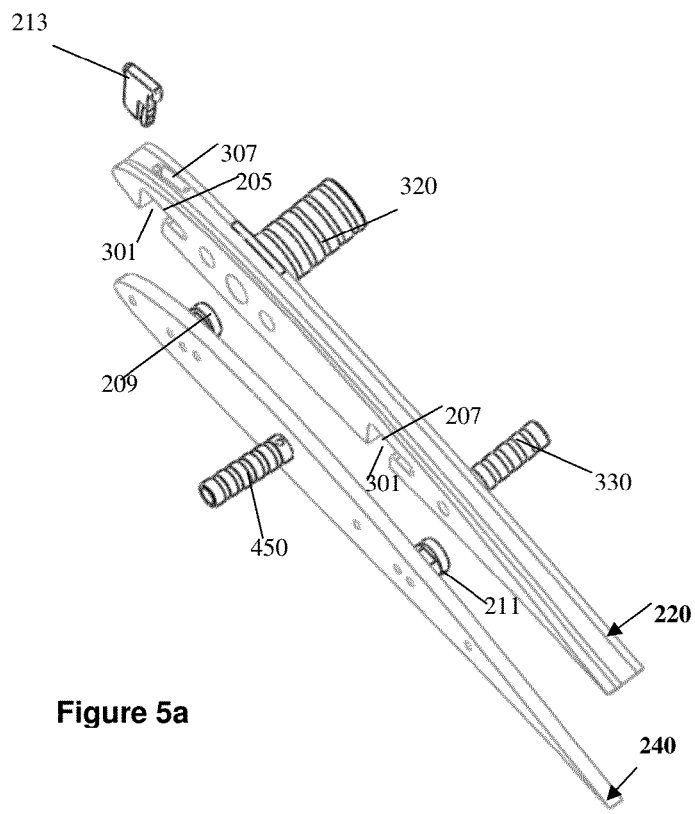
FIGS. 5a to 5d are exemplary views to illustrate a method of locking the centre wing adaptor with the outboard wing adaptor.
Figure 5B:
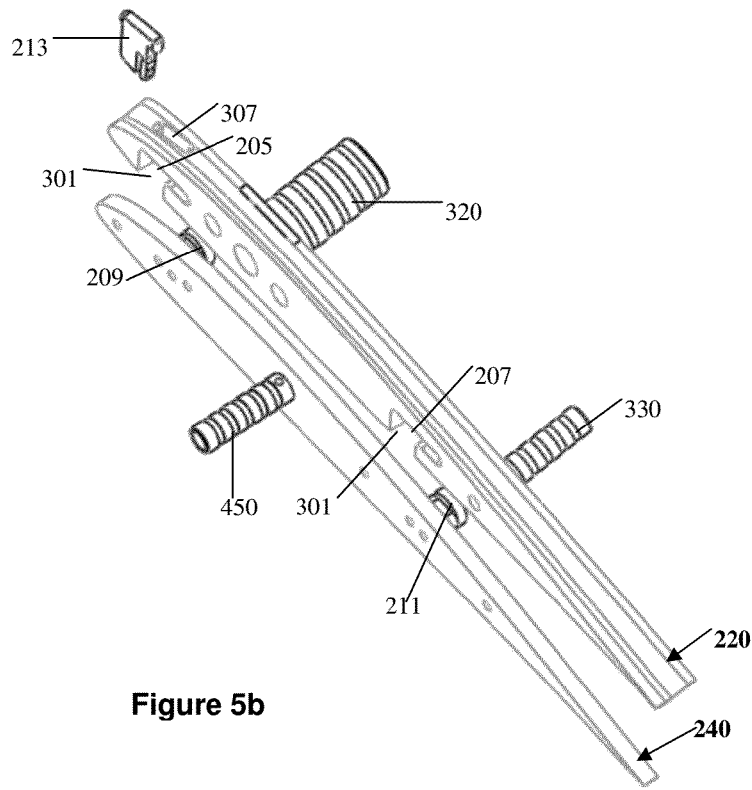
Figure 5C:
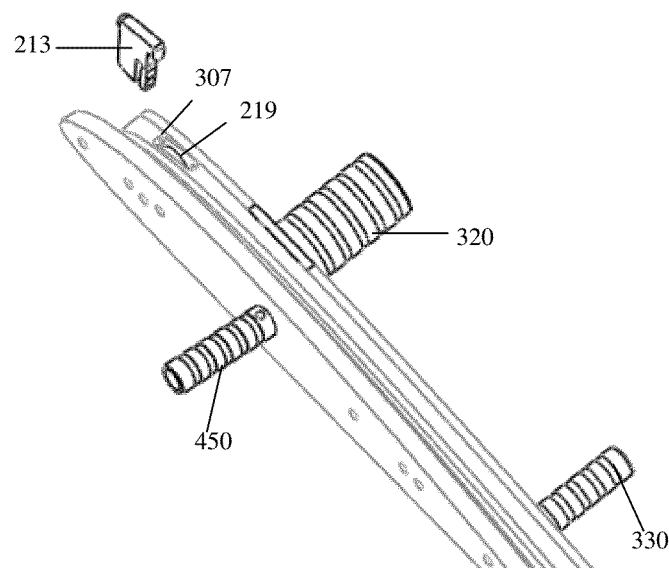
Figure 5D:
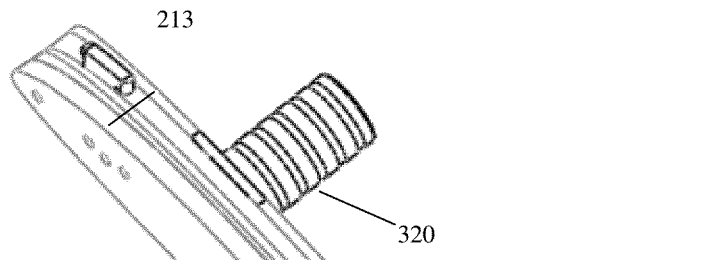

Each of the L-shaped profile lock 205, 207 is operable to engage with a respective locking pin 209, 211 and displace the locking pin 209, 211 to a captive position towards the trailing edge of the centre wing 201 (Refer to FIGS. 5a and 5d).

A substantially flat locking key 213 is shown inserted into a slot 307 (refer FIG. 3a) on a top surface of the centre wing adaptor 220 in order to provide an additional rigid and positive lock that can avoid any relative movement between the centre wing 201 and the outboard wing 203. When inserted, the base of the locking key 213 is hidden within the opening 301 (refer FIG. 3a) located on the underside of the centre wing adaptor 240. The base of the locking key 213 is designed to allow a user to push up the locking key 213 via the opening 301 while unlocking.

Figure 2B:
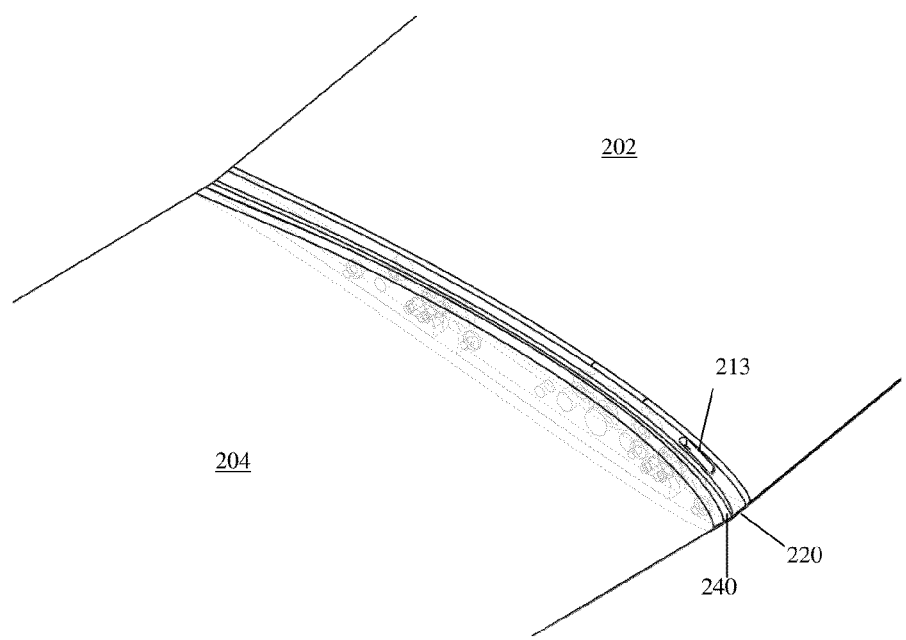

FIG. 2b is a partial perspective view of a centre wing 201 and outboard wing 203 (in a closed position) of an UAV in accordance with an embodiment of the present invention. It can be appreciated, in a locked position, there is substantially minimum gap between the centre wing adaptor 220 and the outboard wing adaptor, whereby a smooth joint between the centre wing 201 and outboard wing 203 is achieved.

FIG. 3a is a perspective view of a centre wing adaptor 220 in accordance with an embodiment of the present invention. The centre wing adaptor 220 has an airfoil-shaped body with a substantially flat end face 305.

The end face 305 of the centre wing adaptor 220 has a locking structure consisting two L-shaped profile locks 205, 207. The first L-shaped profile lock 205 located near the leading edge 309 of the centre wing adaptor 220. The second L-shaped profile lock 207, identical to the profile lock 205, is located near the trailing edge 311 of the centre wing adaptor 220.

Each of the L-shaped profile locks 205, 207 comprise a hollow channel. The hollow channel is formed by lacking a material during a moulding process and the dimensions are appropriate to receive a locking pin 209, 211.

A first arm 302 of each L-shaped profile lock 205, 207 has an opening 301 that points towards the bottom surface of the centre wing adaptor 220, while a second arm 303, substantially perpendicular or inclined to the first arm 302, points towards the trailing edge of the centre wing 201 and terminates into a captive position in the body of the centre wing adaptor 220.

The opposing face of the centre wing adaptor 220 has a pair of anchors 320, 330 for mounting the centre wing adaptor 220 to an outboard edge of the centre wing 201. Attached to the anchor 320, is a launching pin 310, which extends below the bottom surface of the centre wing adaptor 220. The launching pin 310 is used for launching the UAV.

The bottom surface of the centre wing adaptor 220 has a pair of openings 301 corresponding to a respective opening 301 of the first arm 302.

The top surface of the centre wing adaptor 220 has a slot 307 positioned above the first arm 302 of the L-shaped profile lock 205. The slot 307 is designed to accommodate a substantially flat locking key 213 (refer FIG. 2, FIGS. 6a-6c) in order to provide an additional locking to any relative movement between the centre wing 201 and the outboard wings 203.

FIG. 3b is an end view of the centre wing adaptor 220 of FIG. 3a in a direction of 340 showing the relative positioning of the profile locks 205, 207 and the launching pin 310.

FIG. 3c is a sectional view of the centre wing adaptor 220 of FIG. 3a in a direction of 350 showing the slot 307 for accommodating the locking key 213 and inner dimensions of the arms 302, 303 of the L-shaped profile lock 205, 207.

Figure 3D:
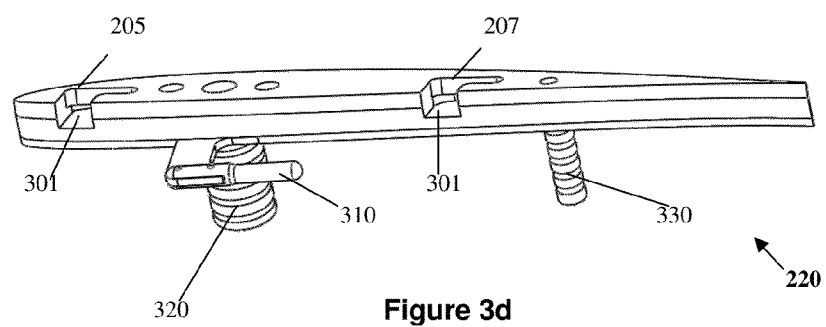

FIG. 3d is a bottom view of the centre wing adaptor of FIG. 3a clearly showing the openings 301 of the L-shaped profile locks 205, 207.

Figure 4A:
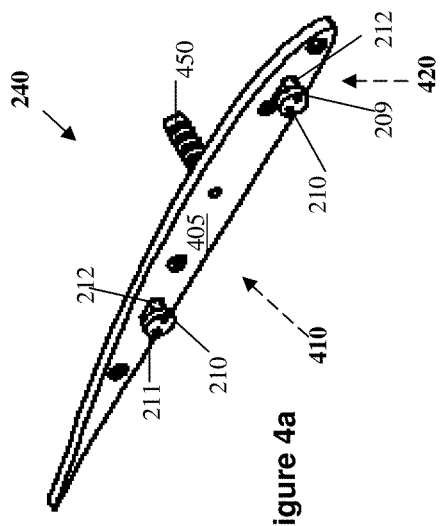
FIG. 4a is a perspective view of an outboard wing adaptor in accordance with an embodiment of the present invention.

FIG. 4a is a perspective view of an outboard wing adaptor 240 in accordance with an embodiment of the present invention.

The outboard wing adaptor 240 also has an airfoil-shaped body with a substantially flat end face 405. A locking pin 209 is located proximate to the leading edge of the outboard wing adaptor 240. Another locking pin 211, identical to the locking pin 209, is located proximate to the trailing edge of the outboard wing adaptor 240. The locking pins 209, 211 comprise a circular head 210 and a stem 212.

Each of the L-shaped profile lock 205, 207 is operable to engage with a respective locking pin 209, 211 and displace the locking pin 209, 211 to a captive position towards the trailing edge of the centre wing 201.

The dimension of the heads 210 matches with that of the openings 301 of the L-shaped profile locks 205, 207. Furthermore, the dimension of the stem 212 matches with that of the openings 303 of the L-shaped profile locks 205, 207. The terminal portion of the arm 303 of the profile locks 205, 207 is towards the trailing edge of the wings 201, 203, such that the L-shaped profile lock 205, 207 engages with a respective locking pin 209, 211 and displaces the locking pin 209, 211 to a captive position towards the trailing edge of the centre wing 201.

An opposing face of the outboard wing adaptor 240 has an anchor 450 for mounting the outboard wing adaptor 240 to an inboard edge of the outboard wing 203. The bottom surface 401 (refer FIG. 4b) of the outboard wing adaptor 240 is substantially flat.

Figure 4D:
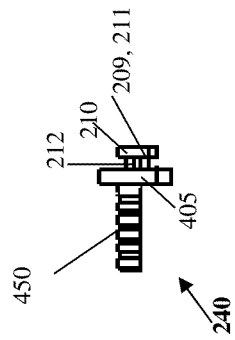
Figure 4C:
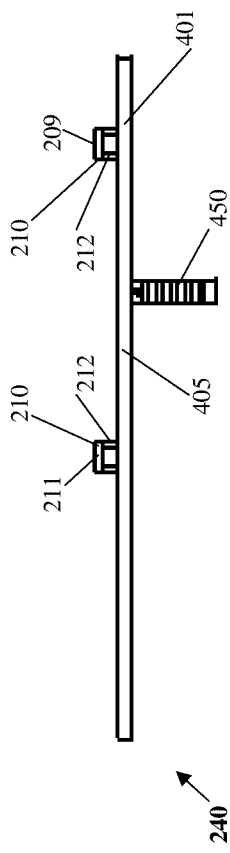
Figure 4B:
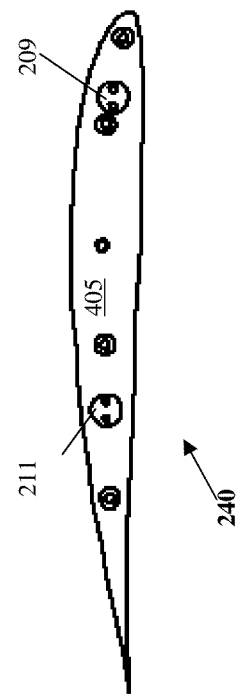

FIG. 4b is an end view of the outboard wing adaptor 240 of FIG. 4a in a direction of 410 showing the relative positioning of the locking pins 209, 211 on the end face 405.

FIG. 4c is a bottom view of the outboard wing adaptor 240 of FIG. 4a in a direction of 420 showing the relative positioning of the locking pins 209, 211 and the anchor 450.

FIG. 4d is a side view of the outboard wing adaptor 240 of FIG. 4a showing the locking pins 209, 211 and the anchor 450.

FIGS. 5a to 5d are exemplary views to illustrate a method of locking the centre wing adaptor 220 with the outboard wing adaptor 240.

As shown in FIGS. 5a and 5b, the outboard wing 203 and centre wing 201 are brought closer such that the locking pins 209, 209 of the outboard wing adaptor 240 are aligned directly below the openings 301 on the underside of the centre wing adaptor 220.

Subsequently, as shown in FIG. 5c, the locking pins 209, 211 are inserted into a respective opening 301 of the centre wing adaptor 220 and the outboard wing 203 is moved upward into the centre wing 201 such that the locking pins 209, 211 reach the upward limit of the arm 302 of the L-shaped profile locks 205, 207.

After this, as shown in FIG. 5d, the centre wing 201 is firmly held by a user and the outboard wing 203 is moved rearward into the centre wing 201 until the lateral limit of the L-shaped profile locks 205, 207 is reached. i.e. at the captive position.

Thereafter, a locking key 213 is inserted into the slot 307 located on the top surface of the centre wing adaptor 220. The locking key 213 is pushed downwards until the base of the locking key locks into the opening 301. After locking, the locking key 213 cannot be unlocked by any vibrations or when the UAV is in operation.

In order to unlock, an operator of the UAV can push up the locking key 213 by applying a force using his/fingers into the opening 301 on the underside of the centre wing adaptor 220 whereby the head of the locking key 511 (refer FIG. 6a) pops out of the slot 307. The locking key 213 is then removed out of the slot 307.

In order to unlock the outboard wing 203 and the centre wing 201, the operations shown in FIGS. 5a-5d are reversed. i.e. the centre wing 201 is firmly held by a user and the outboard wing 203 is moved forward followed by a clockwise twisting action to dislodge the outboard wing 203 from the centre wing 201.

Figure 6A:
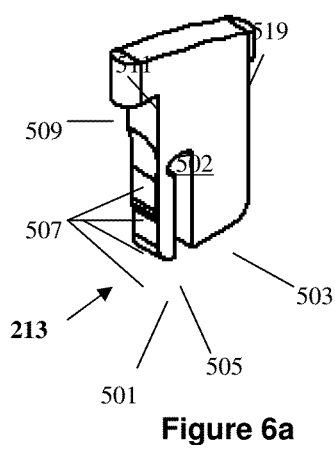
FIG. 6a is a perspective view of a locking key in accordance with an example embodiment.

FIG. 6a is a perspective view of a locking key 213 in accordance with an example embodiment.

The locking key 214 comprises a substantially flat body 502 having a substantially flat head 511 and a base 503. The top surface of the head 511 has an inclination to match the outer surface of the centre wing adaptor 220. Furthermore, the head also has arcuate ends 509, 519 that match with the corresponding arcuate portion of the slot 307. The base 503 has a slit 505 and a resilient arm 501. The resilient arm 501 has a stepped portion 507 which terminates at the head 511. The locking key 213 is designed to be received into the slot 307 on the centre wing adaptor 220.

While insertion, the stepped portion 507 faces the trailing edge 311 of the centre wing adaptor 220. After insertion, the locking key 213 is pushed downward until the base 503 and the arm 501 locks with the opening 301 on the underside of the centre wing adaptor 220 such that the head 511 is flush with the surface of the centre wing adaptor 220. The stepped portion 507 grips with the stem 212 of the locking pin 209 in order to lock the relative movement of the centre wing adaptor 220 and the outer wing adaptor 240.

Figure 6B:
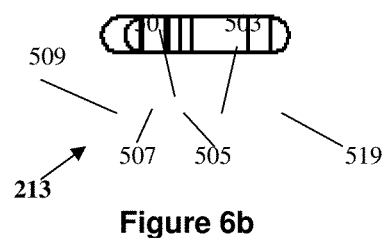

FIG. 6b is a bottom view of the locking key 213 of FIG. 6a showing the two arcuate ends 509, 519 of the head 511, the base 503, the slit 505, the resilient arm 501 and the stepped portion 507.

Figure 6C:
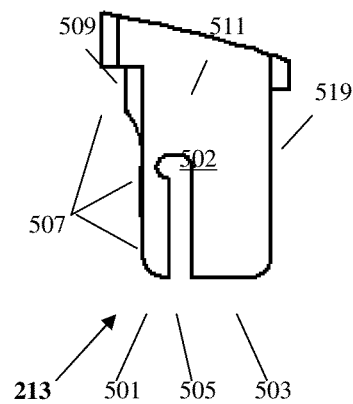

FIG. 6c is a front view the locking key 213 of FIG. 6a showing the inclination of the top surface 511 and its arcuate ends 509, 511, the stepped portion 507, the resilient arm 501, the slit 505 and the base 503.

Figure 7A:
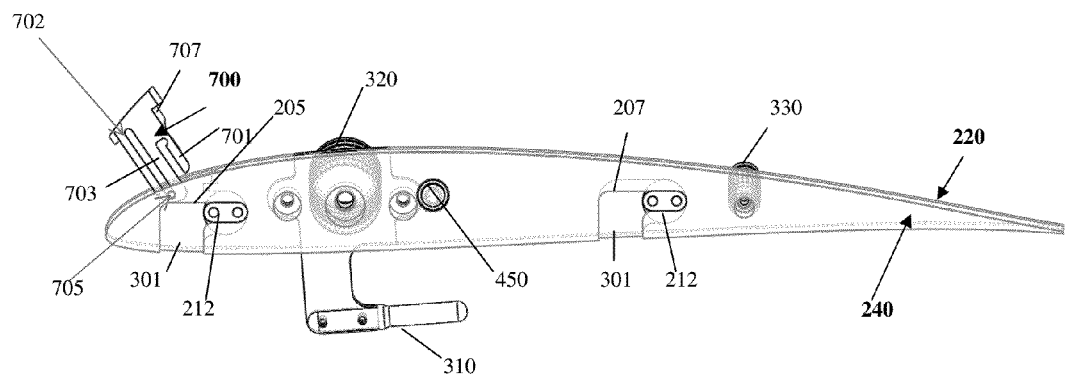
FIGS. 7a and 7b are exemplary views to illustrate a locking key in an alternative embodiment.
Figure 7B:
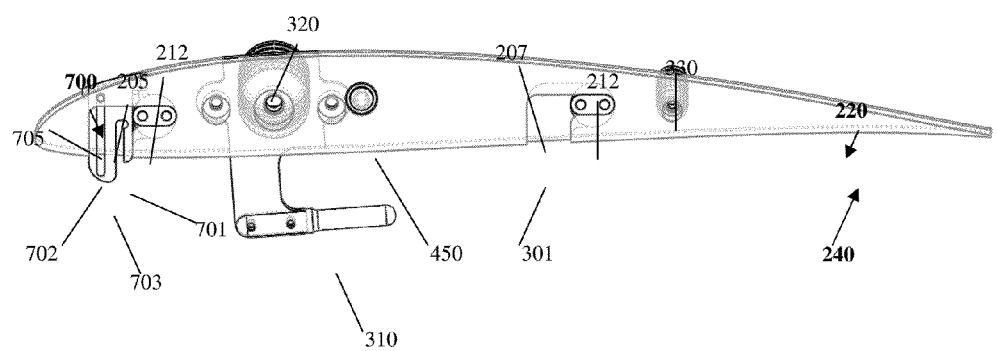

FIGS. 7a and 7b are exemplary views to illustrate a locking key 700 in an alternative embodiment whereby the locking key 700 is prevented from being detached away from the centre wing adaptor 220. In order to exemplify, a stem 212 of the locking pin 209 is positioned into the end of the profile lock 205.

FIG. 7a shows the locking key 700 in an open position. The body of the locking key 700 has an oval shaped slot 702 cut along a height of a base 703 of the locking key 700. A securing pin 705 is inserted into the slot 703 in order to secure the locking pin to the centre wing adaptor 220. As in the previous embodiment the resilient arm 701 has a stepped portion 707.

FIG. 7b shows the locking key 700 in a closed position. Once the centre wing adaptor 220 is locked with the outboard wing adaptor 240, the secured locking key 700 can be easily inserted into the slot 307 of the centre wing adaptor 220. The locking pin 700 is then pushed downward 703 until the base 703 and the arm 701 locks with the opening 301 on the underside of the centre wing adaptor 220 such that the head of the locking pin 700 is flush with the surface of the centre wing adaptor 220. The stepped portion 707 grips with the stem 212 of the locking pin 209 in order to lock the relative movement of the centre wing adaptor 220 and the outer wing adaptor 240. In order to unlock, a user pushes up the base 703 using a finger via the opening 301 until the head of the locking key 700 pops out for removing the locking key 700.

It will be appreciated by a person skilled in the art that numerous variations and/or modifications may be made to the present invention as shown in the specific embodiments without departing from the scope of the invention as broadly described. The present embodiments are, therefore, to be considered in all respects to be illustrative and not restrictive.

For instance, the number of locking pins 209, 211 and the L-shaped profile locks 205, 207 can be more than two. The outboard wing adaptor 240 can be integral with the outboard wing 203. The centre wing adaptor 220 can be integral with the centre wing 201. The locking pins 209, 211 can be provided on the centre wing 201 and the L-shaped profile locks 205, 207 can be provided on the outboard wing with changes to the direction of locking.

Embodiments of the present invention can provide flexibility to alter the wing dihedral angle by merely swapping the centre wing adaptor 220 and/or the outboard wing adaptor 240.

The invention claimed is:

1. A collapsible wing assembly of an unmanned aerial vehicle (UAV) having a fuselage, the assembly comprising:
   a centre wing adapted to be attached to the fuselage; and
   a pair of outboard wings,
   wherein each of the outboard edges of the centre wing comprises a first attachment structure having at least a pair of L-shaped profile locks, and each of the inboard edges of the outboard wings comprises a second attachment structure having at least a pair of locking pins,
   wherein each of the L-shaped profile locks comprises a hollow channel having a first arm pointing towards a bottom surface of the centre wing, and a second arm, inclined to the first arm, pointing towards a trailing edge of the centre wing,
   wherein each of the L-shaped profile locks of the first attachment structure is operable to engage with a respective locking pin of the second attachment structure and displace the locking pin to a captive position towards the trailing edge of the centre wing.

2. The assembly of claim 1, wherein the centre wing comprises a body and a centre wing adaptor mounted to an outboard edge of the body, and wherein the outboard wing comprises a body and an outboard wing adaptor mounted to an inboard edge of the body of the outboard wing, wherein the first attachment structure is provided on an end face of the centre wing adaptor, and the second attachment structure is provided on an end face of the outboard wing adaptor.

3. The assembly of claim 2, wherein airfoils of the centre wing adaptor and outboard wing adaptor match respectively to those of the bodies of the centre wing and the outboard wing.

4. The assembly of claim 2, wherein the centre wing adaptor and the outboard wing adaptor are removably mounted respectively to the centre wing and the outboard wing.

5. The assembly of claim 2, wherein one of the L-shaped profile locks is located proximate to a leading edge of the centre wing adaptor and the other is located proximate to a trailing edge of the centre wing adaptor,
   wherein one of the locking pins is located proximate to the leading edge of the outboard wing adaptor and the other is located proximate to the trailing edge of the outboard wing adaptor.

6. The assembly of claim 1, wherein the first arm is substantially perpendicular to the second arm.

7. The assembly of claim 1, wherein the bottom surface of the centre wing has a pair of openings corresponding to respective openings of the first arm.

8. The assembly of claim 1, wherein a top surface of the centre wing has a slot, positioned above the first arm of the L-shaped profile lock, for receiving a locking key to lock any relative movement of the centre wing and outboard wing in the captive position.

9. The assembly of claim 7, wherein the dimension of a head of the locking pin matches with that of the openings of the first arm of the hollow channel of the L-shaped profile lock, and the dimension of a stem of the locking pin matches with that of the second arm of the hollow channel of the L-shaped profile lock.

10. The assembly of claim 2, wherein an opposing face of the centre wing adaptor and outboard wing adaptor comprises one or more anchors for mounting the centre wing adaptor and outboard wing adaptor respectively to an outboard edge of the centre wing and an inboard edge of the outboard wing.

11. The assembly of claim 8, wherein the locking key comprises a head and a base, wherein the top surface of the head has an inclination to match the top surface of the centre wing, wherein the base has a slit and a resilient arm, the resilient arm comprising a stepped portion comprising a plurality of inclined steps terminating at the head.

12. The assembly of claim 11, wherein in a locked position, the stepped portion is operable to grip the stem of the an adjacent locking pin in order to lock any relative movement of the centre wing and the outer wing, and the base of the locking key locks with the opening found on the bottom surface of the centre wing.

13. The assembly of claim 9, wherein the body of the locking key comprises a slot for inserting a securing pin in order to secure the locking pin to the centre wing.

14. A method of locking a collapsible wing assembly of an unmanned aerial vehicle (UAV) having a fuselage, the method comprising the steps of:

providing a centre wing adapted to be attached to the fuselage;
providing a pair of outboard wings;
providing a first attachment structure to each outboard edges of the centre wing, the first attachment structure having at least a pair of L-shaped profile locks, wherein each of the L-shaped profile locks comprises a hollow channel having a first arm pointing towards a bottom surface of the centre wing, and a second arm, inclined to the first arm, pointing towards a trailing edge of the centre wing;
providing a second attachment structure to each inboard edges of the outboard wings, the second attachment structure having at least a pair of locking pins;
engaging each of the L-shaped profile locks of the first attachment structure with a respective locking pin of the second attachment structure; and displacing the locking pin to a captive position towards the trailing edge of the centre wing.

15. The method of claim 14, wherein the centre wing comprises a body and a centre wing adaptor mounted to an outboard edge of the body, and wherein the outboard wing comprises a body and an outboard wing adaptor mounted to an inboard edge of the body of the outboard wing, wherein the first attachment structure is provided on an end face of the centre wing adaptor, and the second attachment structure is provided on an end face of the outboard wing adaptor.

16. The method of claim 15, further comprising a step of inserting a locking key into a slot provided on the centre wing adaptor to lock the relative movement of the centre wing and the outboard wing.

17. A method of unlocking the collapsible wing assembly locked by the method of claim 16, the method comprising the steps of:
releasing the locking key;
holding the centre wing and moving the outboard wing towards the leading edge of the centre wing; and
moving the outboard wing downward to release the outboard wing.

* * * * *